Aug. 8, 1961 G. E. ROWE 2,994,986
GLASSWARE FORMING MACHINE
Filed Nov. 16, 1953 5 Sheets-Sheet 1

INVENTOR
GEORGE E. ROWE
BY Bates & Willard
ATTORNEYS

Aug. 8, 1961   G. E. ROWE   2,994,986
GLASSWARE FORMING MACHINE
Filed Nov. 16, 1953   5 Sheets-Sheet 2
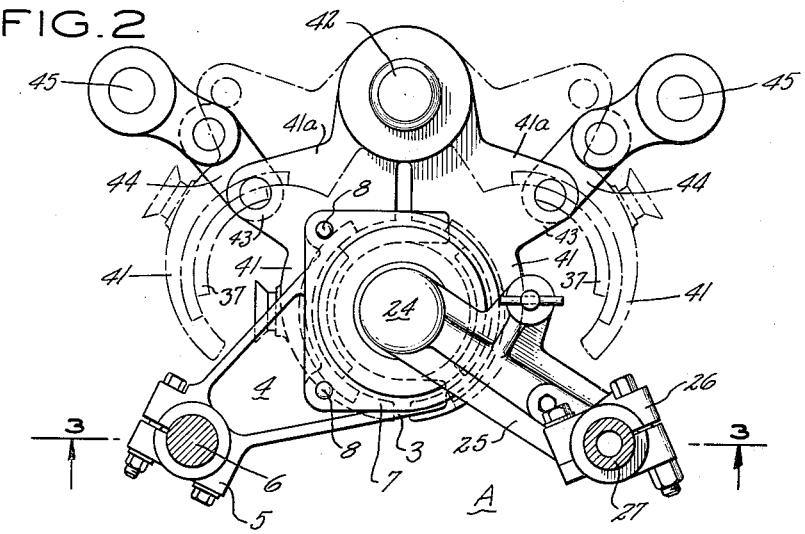
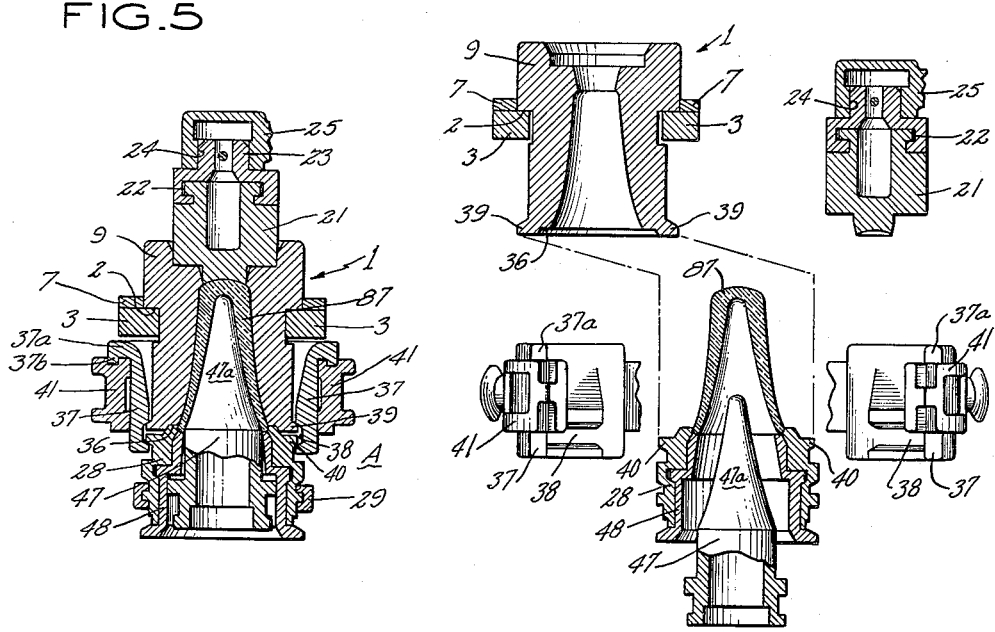
INVENTOR
GEORGE E. ROWE
BY Bates & Willard
ATTORNEYS

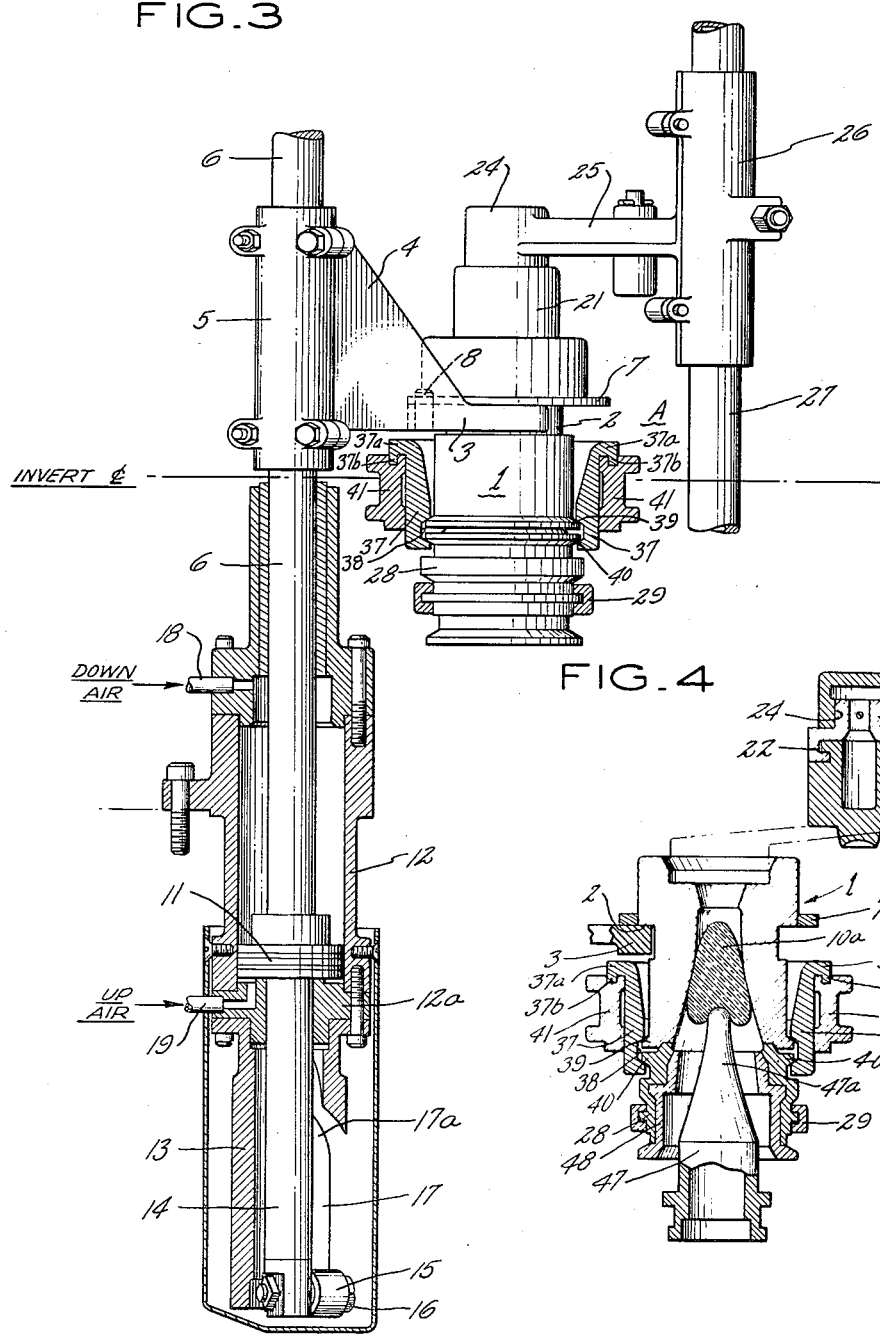

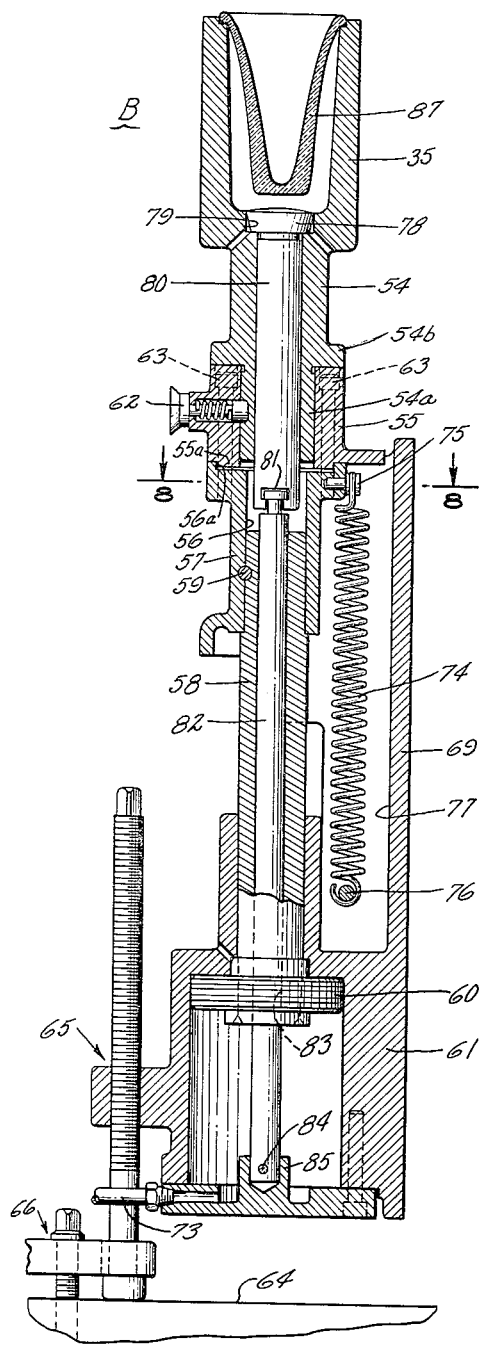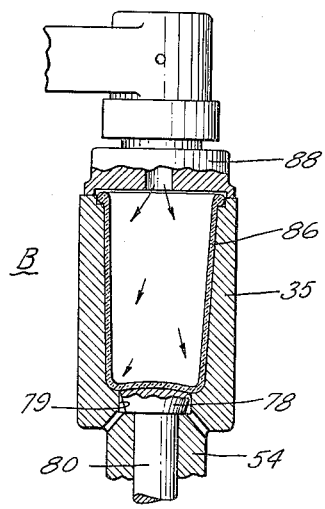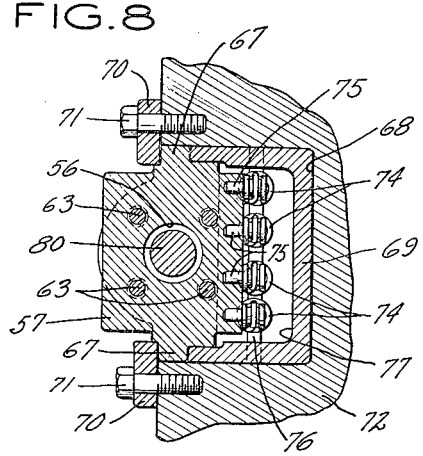

Aug. 8, 1961

G. E. ROWE 2,994,986

GLASSWARE FORMING MACHINE

Filed Nov. 16, 1953

INVENTOR
GEORGE E. ROWE
BY *Bates + Willard*
ATTORNEYS

United States Patent Office 2,994,986
Patented Aug. 8, 1961

2,994,986
GLASSWARE FORMING MACHINE
George E. Rowe, Wethersfield, Conn., assignor to Emhart Manufacturing Company, Hartford, Conn., a corporation of Delaware
Filed Nov. 16, 1953, Ser. No. 392,315
7 Claims. (Cl. 49—9)

This invention relates to improvements in glassware forming machines and more particularly to improvements in glassware forming machines of the type known as the Hartford I.S. Machine.

In this type of glassware forming machine, a parison forming mechanism is located at a fixed station to which a charge of molten glass produced by an overhead feeder is delivered. The charge is formed at this station into an inverted parison appropriate to be blown in an associate blow mold to produce the glass article desired. The blow mold is located at a second relatively fixed station to which each parison formed at the first station is transferred by suitable transfer mechanism and at which such parison is blown to the shape of the article desired.

The parison forming mechanism of a glassware forming machine of the type referred to and as constructed prior to this invention comprises separately formed parison body and neck finish or rim molds, each consisting of suitably supported and operated openable and closable halves or sections. When a parison has been formed in the inverted parison mold comprising these mold parts, the halves of the parison body mold are swung apart and the neck finish or rim mold, commonly called the "neck ring" is moved bodily by the transfer mechanism from the first station to the second or blow mold station and opened there to deliver the parison to the blow mold. The blow mold also is made of two openable and closable halves and these are closed around the body of the parison depending from the closed neck ring at the blow mold station at the end of the parison transferring movement of the neck ring. The latter then is opened to release the parison to the blow mold.

The glass articles produced by a glassware forming machine substantially as just described have longitudinal external seams on their bodies, this because of the sectional character of the parison body and article blow molds employed.

An object of the present invention is to adapt the glassware forming machine of the general character described for operation to produce glass articles free from the longitudinal external seams on their bodies.

A more specific object of the invention is to provide for use in a glassware forming machine of the type referred to of one-piece or block type parison body and article blow molds instead of the sectional type molds previously employed whereby to obviate longitudinal external seams on the bodies of the articles produced by such machine.

A further object of the invention is the provision in a glassware forming machine of the character described of improved releasable means to clamp the inverted one-piece parison body mold and neck ring together at the parison forming station. Due to the elimination of the vertical seam between the openable and closable parts of the prior art body mold and the improved clamping action, mold repair costs in connection with the operation of the parison forming assembly should be reduced.

In carrying out these objects, a one-piece or block type blow mold and supporting and operating means therefor as hereinafter described may be substituted for the customary sectional type blow mold and supporting and operating parts. A single piece or block type parison body mold formed with an integral funnel extension at its upper end may be mounted on the funnel carrying movable arm of the original construction. The parison body mold holder arms of the basic construction may then be utilized to carry openable and closable jaws for clamping the parison body mold and neck ring together. These alterations may be made in a glassware forming machine of the character described whether the parison forming mechanism thereof includes a neck pin and customarily associated parts or an inverted pressing plunger and usual plunger operating and positioning parts, both forms of parison forming mechanism and their respective advantages being known. In the example shown by the accompanying drawings, the molds are suitable for the production of a tumbler and a parison forming mechanism having an inverted pressing plunger and associated parts usual for press-and-blow operation therefore is shown since this is preferable for production of glass articles having a wide mouth, as in the case of tumblers, jars, etc.

In the accompanying drawings:

FIG. 2 is a top plan view of the parison forming mechanism;

FIG. 3 is a vertical section along the line 3—3 of FIG. 2 showing the means for movably supporting and operating the one-piece or block type parison body mold;

FIGS. 4, 5 and 6 are fragmentary vertical sectional views at the parison forming station showing different positions of the parts employed during the forming of a parison;

FIG. 7 is a vertical section through the improved blow mold mechanism;

FIG. 8 is a horizontal cross-section along the line 8—8 of FIG. 7;

FIG. 9 is a fragmentary vertical cross-sectional view of the blow mold and associate parts during the blowing operation.

Figure 1:
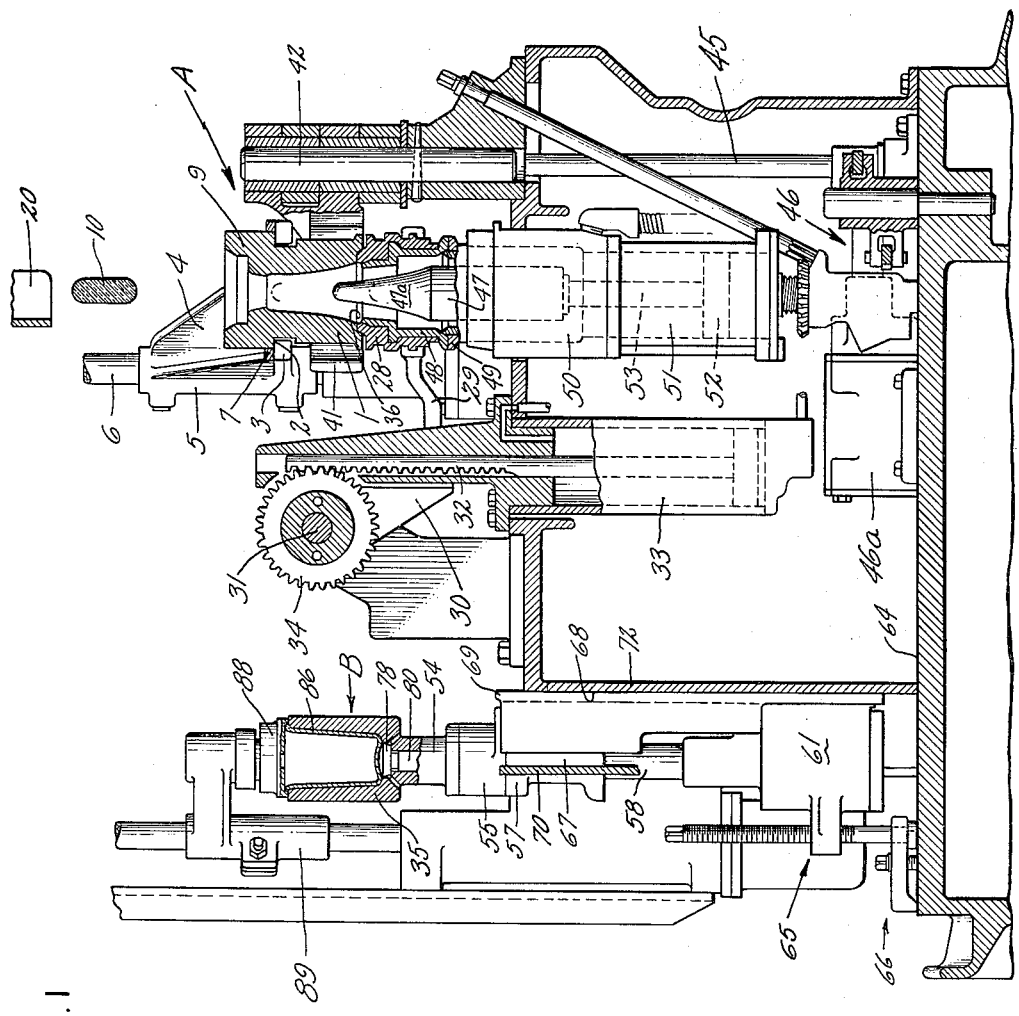
FIG. 1 is a vertical section through a glassware forming machine of the type referred to when equipped with one-piece or block type body and blow molds and other improvements of the present invention, some of the elements of the structure shown being wholly or partly in elevation.

In the embodiment of the invention shown in the drawings, an inverted open-ended one-piece or block-type parison body mold 1, FIGS. 1 and 3 to 6 inclusive, is provided instead of the usual inverted two-part partible parison body mold of the prior art. This one-piece parison body mold is formed with a horizontal groove 2 in its outer side wall. An arcuately curved parison mold lifter 3 fits in this groove close to the bottom thereof and is of sufficiently less vertical thickness than the width (vertical dimension) of the groove to permit a slight further vertical downward movement of the lifter independently of the body mold if need be for a purpose presently to be explained. The lifter 3 may be an integrally formed outer end portion of a bracket arm 4 which is firmly secured by a clamp 5 to a vertically reciprocable vertical rod 6. A retaining ring 7 fits on the parison body mold 1 directly over the lifter 3 to which the latter is secured, as by pins 8, FIGS. 2 and 3, so as to prevent unintended lateral displacement of the parison body mold 1 from its lifter 3.

In the example shown, the inverted parison body mold 1 has an integral upward extension 9 co-axial therewith and suitably formed and configured to serve as a funnel for guiding a charge of molten glass, such as is shown at 10, FIG. 1, axially downward into the cavity of the parison body mold 1 when the latter is in its active or molding position at a parison forming station A.

As shown in FIG. 3, the rod 6 is a piston rod which extends upwardly from a piston 11 which is reciprocable in a vertical cylinder 12 that is located in a relatively fixed position below the level of and at one side of the parison forming station A. A tubular guide member 13 depends from the lower head 12a of cylinder 12 around a downwardly extending rod 14 depending from piston 11. A cam follower 15 in the form of a roller mounted on a horizontal stud or bolt 16 carried by the rod 14 rides up and down in a cam slot 17 in the wall of tubular member 13 when piston 11 is reciprocated. This cam slot is vertical from its lower end for part of its length and then curves laterally as indicated at 17a. The arrangement is such that when the piston 11 is moved vertically upward from its position at the lower end of cylinder 12 (as shown in FIG. 3) the parison body mold 1 will be lifted straight upward from its active or molding position as shown in FIG. 1 for a predetermined distance and then will be swung laterally about the axis of its supporting rod 6 during the remainder of its upward travel. This is to assure an inactive out-of-they-way position of the parison body mold 1 that will not interfere with the movements of other movable elements to and from the parison forming station A. The parison body mold 1 will be returned along this same path so that it will be positioned at the parison forming station A as shown in FIG. 3 when the piston 11 has been returned to the lower end of cylinder 12.

Air under pressure may be admitted alternately to the upper and lower ends of the cylinder 12, as through pipes 18 and 19, respectively, to reciprocate the piston 11 and connected parts relative to cylinder 12, it being understood that spent piston operating air may be vented from either end of the cylinder through the pipe 18 or 19 provided there or in any other suitable known manner when piston operating air is being supplied to the opposite end of the cylinder. The application and exhaust of air to and from each of the opposite ends of cylinder 12 may be controlled by a timing mechanism such as customarily is included in a forming machine of the type here involved. Ingle Patent 1,911,119 of May 23, 1933, discloses timing mechanism and pneumatic control features suitable for the purpose.

The integral extension 9 at the upper end of the inverted parison body mold 1 not only may serve as a funnel guide for a charge dropping from an overhead feeder chute 20, as in FIG. 1, but may be formed internally to serve as a seat for a parison mold baffle 21, FIGS. 3 to 6 inclusive. This parison mold baffle may be secured releasably, as by a bayonet joint 22, FIGS. 4, 5 and 6, to a coupling member 23 which fits in a downwardly turned socket 24 on the outer end portion of a horizontal arm 25. The latter is secured at its opposite or inner end by a clamp 26 to an upright vertical rod 27. The parts 21 to 27 inclusive as just described may be conventional parts of a forming machine of the type hereinbefore referred to as being well known in the prior art and the rod 27 may be supported and operated by mechanism (not shown) substantially like that shown and described for supporting and operating rod 6 so that the baffle 21 will be reciprocated between an inactive, out-of-the-way position at a higher level and at one side of the parison forming station A and a lower active position where it is seated in an upward extension 9 of the parison body mold 1 at station A. The raised out-of-the-way position of the baffle is shown in FIGS. 4 and 6 while its lower active position is shown in FIGS. 2, 3 and 5.

The parison forming mechanism at station A includes, in addition to the one-piece inverted parison body mold 1, a neck ring 28 which may be of conventional two-part form and supported and operated by conventional means of the prior art machine. The two parts or halves of the neck ring 28 are carried by holders on supporting arms, one of which is shown, and is indicated at 29 in FIG. 1. These arms are mounted on a carrier 30 which is mounted for oscillatory movement about the axis of a horizontal shaft 31. The arrangement also is such as to permit relative movements between the arms which carry the neck ring halves axially of the shaft 31 so as to open and close the neck ring halves at appropriate times. A vertical rack bar 32 is reciprocated by an air motor 33 while in mesh with a pinion 34 which turns about the axis of shaft 31 and oscillates the carrier 30 about that same axis. Each upward stroke of rack bar 32 from the position shown in FIG. 1 will cause swinging of the neck ring from its molding position at station A through approximately 180° to a position to deliver a parison carried thereby to a blow mold 35 at a blowing station B, FIG. 1. The neck ring will be opened to release the parison to the blow mold. A downward stroke of rack bar 32 will return the neck ring to the parison forming station A. The neck ring will be closed by the time it arrives at station A so as to be ready for use in the formation of the next parison. This parison transfer mechanism does not per se form part of the present invention and the details thereof may be substantially as disclosed in the aforesaid Ingle Patent 1,911,119.

The extreme upper end of the closed neck ring 28 may fit into a shallow counterbored seat 36 in the extreme lower end portion of the inverted parison body mold 1 when the neck ring has been brought to its molding position at station A and the parison body mold has been lowered to seat thereon as is shown in FIG. 1. This assembly of these parts can be effected without pressure on the neck ring from the power mechanism by which the parison body mold is lowered should there be a further slight downward movement of the body mold lifter 3 after the body mold seats on the neck ring. The mounting of the body mold on its lifter permits sufficient play between them for this purpose.

The parison body mold 1 and neck ring 28 are clamped firmly together in their aligned, cooperative positions at the parison forming station A by a pair of arcuately curved jaws 37 which, when closed, grip between them the adjacent end portions of the assembled body mold and neck ring. These jaws may have their inner, confronting faces transversely grooved as indicated at 38, FIGS. 3, 4 and 5, so as to exert a camming action on the upper and lower surfaces, respectively of aligned external beads 39 and 40 which respectively are formed on the adjacent end portions of the parison body mold 1 and neck ring 28. Closing of jaws 37 therefore not only assures accurate axial alignment of the parison body mold and neck ring but forces these two parts endwise together and holds them firmly against relative movements during the formation of a glass parison therein. This will tend to extend the useful life in service of the parison body mold and neck ring assembly and therefore to reduce mold repair costs incident to operation of the machine.

The jaws 37 have upper portions 37a which are turned outwardly and then downwardly as indicated at 37b, FIGS. 3, 4 and 5, so as to serve as hangers which are adapted to be hooked over and to engage with top grooved, arcuately curved holders 41 on arms 41a pivotally mounted on an upright stationary post 42. According to the present invention, the jaws 37 for clamping the one-piece parison body mold and neck ring together at the parison forming may be carried and operated by the mechanism that is provided in the basic machine of the type involved to carry and operate the halves of the customary two-part body mold. Elements 41, 41a and 42 are included in that mechanism. Arms 41a have ears 43 connected by links 44 to vertical rock shafts 45. These rock shafts are turned in opposite directions about their individual axes by an operating mechanism indicated generally at 46 in FIG. 1. This operating mechanism includes an air motor 46a, the operations of which may be timed and controlled by timing and control means such as are customarily provided in a machine of the type referred to. The jaws 37 may thus be opened and closed at appropriate times.

The parison forming mechanism in the form shown in the drawings includes a vertically disposed pressing plunger 47 having a tapering tip portion 47a extending through a thimble guide ring 48 and the closed neck ring 28 into the cavity of the inverted body mold to a predetermined level in the latter. The thimble guide ring 48 fits within the closed neck ring and is carried in a conventional manner by the neck ring halves. When the neck ring is in its molding position as shown in FIG. 1, the thimble guide ring 48 rests upon the surface of a cylindrical member 49 that projects from the upper end of a cylindrical holder 50 on a vertical air motor cylinder 51. A vertically reciprocable piston 52 in cylinder 51 is connected by a rod 53 operatively to the plunger 47. The details of the plunger positioning and operating mechanism do not per se form part of the present invention and may be substantially as disclosed in my Patent No. 2,508,890, issued May 23, 1950, for Apparatus for Forming Glassware.

The blow mold 35 at station B is a one-piece or block-type mold instead of the customary two-part blow mold. Blow mold 35 has a depending tubular stem 54. The lower end portion of this mold stem is indicated at 54a as fitting in a sleeve 55 and as having an external flange 54b resting upon the upper end surface of this sleeve. The sleeve 55 has a reduced lower end portion 55a fitting in a counterbore 56a at the upper end of a vertical bore 56 formed through a slide block 57. Bore 56 receives the upper end portion of a tubular piston rod 58 which is pinned at 59 to block 57. Piston rod 58 extends upwardly from a piston 60 that is reciprocable in a vertically disposed air cylinder 61. A spring-loaded latch pin 62 fastens the sleeve 55 releasably to the blow mold stem and suitable fastening means, indicated by the cap screws 63, fasten the sleeve 55 to the underlying block 57. The arrangement permits selective use of different blow molds, which are intended for use in the production of various hollow articles of a wide variation of sizes and shapes.

Figure 10:
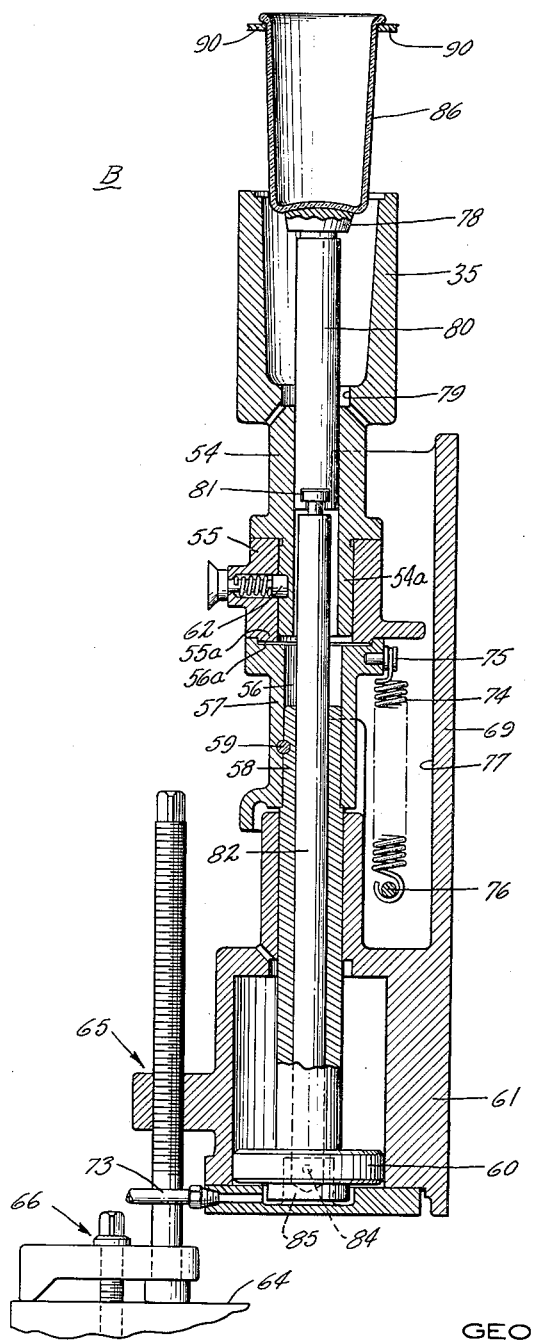
FIG. 10 is a vertical cross-sectional view like FIG. 7 but with the blow mold in a downwardly retracted position and with takeout tongs indicated for removal of the blown glass article.

The cylinder 61 and the parts carried thereby are adjustable vertically as a unit with relation with a fixed level support 64, being supported on the latter by an adjusting mechanism indicated at 65 in FIGS. 7 and 10. The clamping arrangement indicated at 66 is to maintain any height adjustment that has been effected by the adjusting mechanism 65.

The slide block 57 is formed at its opposite sides with a pair of integral vertical slide strips 67 which are disposed in the outer part of a square-cornered guideway 68 in sliding contact with the vertical outer edges of the flanges of a vertical channel-shaped guide member 69 that may be integral with and upstanding on part of the wall of the vertical cylinder 61. Retaining strips 70 are fastened by screws 71 to a stationary part 72 of the machine structure. The vertical guideway 68 is formed in the stationary part 72 and the channel-shaped guide member 69 and part of the wall of cylinder 61 are disposed therein for vertical sliding movements relative thereto when adjusting means 65 is operated.

An upward stroke of piston 60 in cylinder 61 from the lower end of that cylinder as shown in FIG. 10 to the upper end thereof as in FIG. 7 will raise tubular piston rod 58, slide block 57, connecting sleeve 55 and the blow mold 35 as a unit to the positions shown in FIG. 7. This upward stroke of the piston may be effected by air under pressure admitted at the bottom end of the cylinder, as by the pipe 73. Return of these parts to their lowered positions may be effected by the action of coil springs 74 which have their upper ends fastened, as by pins 75, to slide block 57 and their lower ends fastened to a cross-rod 76 in the lower part of a space 77 back of the slide block in the channel-shaped integral upward extension 69 of the wall of cylinder 61, the cross rod being fixed in place in such extension.

A blow mold bottom plate 78 fits in a central opening 79 in the bottom part of mold 35 when the blow mold is in its raised position as shown in FIG. 7. This blow mold bottom plate is carried by a depending vertical rod section 80 that extends slidably through the blow mold stem 54 into the bore 56 of slide block 57 where it is connected, as by a bayonet joint 81, to the upper end of a vertical rod section 82 that extends through the bore of the piston rod 58 and through a central opening 83 in the piston downwardly to the bottom of the cylinder 61 where it is fastened as by a pin 84 in a socket 85 on the bottom end of the cylinder. The arrangement is such that when the blow mold is lowered in the manner described, the blow mold bottom plate 78 will remain at the same level and hence the blow mold will be stripped downwardly from an article 86 that has been formed therein and which rests on the relatively raised bottom plate 78.

A cycle of operations of the machine just described may be substantially as follows. Starting with the parison forming parts in their active positions as shown in FIG. 1, charge 10 will descend onto the tip 47a of the pressing plunger 47 in the cavity of the inverted body mold and is indicated there as 10a in FIG. 4. The parison mold bottom plate 21 will be moved from its raised, out-of-the-way position shown in FIG. 4 to its active position at the top of the inverted parison body mold. The pressing plunger is given its upward pressing stroke. This will form the charge into an inverted parison as indicated at 87 in FIG. 5. Following this formation of the parison, the pressing plunger is withdrawn downwardly, the clamping jaws holding the parison body mold and neck ring together are opened, the baffle 21 is raised and swung laterally in one direction and the one-piece parison body mold is raised and swung laterally in the opposite direction, all as shown in FIG. 6. The neck ring is then moved by the transfer mechanism to the blow mold station, being reverted to upright position during this movement. The blow mold is raised and the neck ring is opened to release the parison 87 to the blow mold 35, as shown in FIG. 7. The neck ring is returned to its parison forming position, being inverted and closed en route.

A blow head 88 that is carried and operated by conventional blow head operating mechanism 89 is then moved from a raised out-of-the-way position downwardly to an active position on the upper end of the blow mold 35 as shown in FIGS. 1 and 9 and blowing air is supplied thereby into the parison to expand it against the walls of the blow mold cavity to form the article 86. In the example shown, article 86 is a tumbler but other glass articles of different shapes and sizes may be made, molding parts of suitable shapes and sizes being selected and used as described.

After the blowing step has been completed, the blow head will be returned to its raised inactive position, the air pressure within the lower part of cylinder 61 will be relieved so that the springs 74 will return the blow mold 35 downwardly to the position shown in FIG. 10. The blown article may be engaged by suitable takeout tongs, indicated at 90 in FIG. 10, and lifted from the blow mold bottom plate and deposited on a suitable conveyor (not shown) or other suitable support.

Instead of a pressing plunger and associated elements for use in forming a charge of glass into a parison as herein described a neck pin and associated elements as in the machine disclosed by the Ingle Patent 1,911,119 may be provided and used for that purpose, it only being essential that the external shape of the parison shall be appropriate for upward stripping of the one-piece parison body mold therefrom and for expansion in the one-piece final blow mold into an article from which the final blow mold can be stripped downwardly.

I claim:
1. In a glassware forming machine, an open-ended single piece parison body mold, means for movably supporting said parison body mold for positioning it at one time in an inverted position at a parison forming station and at another time in a raised out-of-the-way position, a partible neck ring located directly below and in cooperative relation with the inverted parison body mold when the latter is at said parison forming station, means cooperative with said neck ring and said inverted parison body mold at said parison forming station to form a charge of molten glass into a parison having a lower end portion held in the neck ring and a body portion disposed in the inverted parison body mold, said parison being adapted to remain attached to and supported by the neck ring when the parison body mold is moved from its position at said parison forming station to its raised out-of-the-way position, means to move said neck ring and the parison supported thereby to a blow mold station, an upright one-piece blow mold at said blow mold station in position to receive the parison from the neck ring when the latter arrives there, means cooperative with said blow mold for blowing the parison therein to an article of the final shape desired, and means to effect relative vertical movement between the blown article and the blow mold for removal of the article from the blow mold.

2. In a glassware forming machine, an open-ended one-piece parison body mold, means for movably supporting said parison body mold for positioning it at one time in an inverted position at a parison forming station and at another time at a raised out-of-the-way position, a partible neck ring located directly below and in cooperative relation with the parison body mold at said parison forming station, and means cooperative with said neck ring and said inverted parison body mold at said parison forming station to form a charge of molten glass into a parison having a lower end portion held in the neck ring and a body portion disposed in the inverted parison body mold, said means for supporting said body mold being operable to raise the parison body mold straight upward to strip it from the formed parison so as to leave the latter upstanding from and supported only by the neck ring.

3. In a glassware forming machine, the combination specified by claim 2 and, in addition, clamping means engageable with the adjacent end portions of the inverted parison body mold and the neck ring at said parison forming station to hold them axially aligned and against relative movements therebetween during the formation of said parison therein.

4. In a glassware forming machine, the combination with a partible two-part neck ring supported in an inverted position at a parison forming station of an inverted single piece parison body mold open at both ends, a movable parison body mold lifter supportingly embracing said parison body mold and operable to move it between a relatively raised out-of-the-way position above and laterally of said parison forming station and a lowered active position at which the parison body mold rests on the partible neck ring at the parison forming station in cooperative relation therewith, and means cooperative with said neck ring and said inverted parison body mold at said parison forming station to form into a parison a charge of molten glass that has descended into the parison body mold at the parison forming station through the open upper end of said body mold.

5. In a glassware forming machine, the combination specified by claim 4 wherein the supporting engagement of said lifter with said inverted parison body mold is such as to permit a slight further downward movement of the lifter independently of the parison body mold when the parison body mold has been lowered to position to rest upon said neck ring at said parison forming station and, in addition, clamping means engageable with the adjacent portions of the inverted parison body mold and the neck ring at said parison forming station to hold them firmly in place at that station and against relative movements therebetween.

6. In a glassware forming machine, the combination specified by claim 4 wherein the means cooperative with the neck ring and inverted body mold at the parison forming station to form a charge of molten glass into a parison therein comprises a baffle movable from an out-of-the-way position to a position at which it closes the upper end of the parison body mold after the charge has descended into the body mold, a vertically movable pressing plunger having a tapering tip projecting from below upward through the neck ring into the lower part of the inverted parison body mold to intercept and support the charge descending in the parison body mold, said plunger being raisable in the parison body mold toward the baffle at the upper end of said mold to press the charge in the body mold and neck ring into the parison desired, and positioning and operating means for said plunger.

7. In a glassware forming machine, the combination specified by claim 4 and, in addition, a pair of supporting arms swingable at opposite sides of the adjacent end portions of the parison body mold and neck ring at the parison forming station, and clamping jaws carried by said arms and operable by swinging movements thereof to grip between them the adjacent end portions of the parison body mold and neck ring at said parison forming station.

References Cited in the file of this patent
UNITED STATES PATENTS

| | | |
|---|---|---|
| 626,072 | Messer | May 30, 1899 |
| 1,901,934 | Smith | Mar. 21, 1933 |
| 1,911,119 | Ingle | May 23, 1933 |
| 2,084,285 | Wadman | June 15, 1937 |
| 2,123,145 | Pieler | July 5, 1938 |
| 2,273,777 | Berthold | Feb. 17, 1942 |
| 2,357,501 | Carnahan | Sept. 5, 1944 |
| 2,500,083 | MacConnell | Mar. 7, 1950 |
| 2,508,890 | Rowe | May 23, 1950 |
| 2,598,524 | Fouse | May 27, 1952 |

Disclaimer

2,994,986.—*George E. Rowe*, Wethersfield, Conn. GLASSWARE FORMING MA-
CHINE. Patent dated Aug. 8, 1961. Disclaimer filed Nov. 22, 1963,
by the assignee, *Emhart Manufacturing Company*.
Hereby enters this disclaimer to claims 2 and 4 of said patent.
[*Official Gazette February 4, 1964.*]